United States Patent

[11] 3,633,973

[72] Inventor Richard E. Chesterman
 543 Chesterton Ave., Belmont, Calif. 94002
[21] Appl. No. 43,339
[22] Filed June 4, 1970
[45] Patented Jan. 11, 1972

[54] CEMENT RESURFACING MACHINE
 3 Claims, 3 Drawing Figs.
[52] U.S. Cl. .................................................. 299/37, 94/49, 173/24, 173/102
[51] Int. Cl. ...................................................... E01c 23/09
[50] Field of Search .......................................... 299/37; 172/40; 173/24, 102, 114; 94/48, 49

[56] References Cited
UNITED STATES PATENTS

| | | | |
|---|---|---|---|
| 1,034,675 | 8/1912 | Baldwin ........................ | 173/114 X |
| 3,498,384 | 3/1970 | Ogura ........................... | 94/48 X |
| 3,497,017 | 2/1970 | Goettl et al. .................. | 94/49 X |

FOREIGN PATENTS

| | | | |
|---|---|---|---|
| 40,183 | 6/1919 | Austria ......................... | 299/37 |

Primary Examiner—Ernest R. Purser
Attorney—Joseph F. Cole

ABSTRACT: A cement resurfacing machine for roughening or scarifying a cement floor or the like, wherein wheels ride along the cement, and the machine has a carriage frame that is periodically raised to permit the machine to be advanced. This carriage frame is provided with a lower horizontal impact plate, the latter having a grid of pointed chisels on its underneath surface, and a vertically movable platform is periodically raised and then dropped against the impact plate so as to drive the chisels into the cement.

INVENTOR
RICHARD E. CHESTERMAN
BY Joseph F. Cole
ATTORNEY

CEMENT RESURFACING MACHINE

The general object of the invention is to provide a machine that may be used to roughen or scarify a cement floor or the like, and especially after the surface of the cement has become slick, for example, in warehouses and passenger terminals, or in any other place where the cement must be resurfaced.

More specifically stated, it is proposed to provide a cement resurfacing machine, wherein a carriage frame has a lower horizontal impact plate having a grid of pointed chisels on its underneath surface, and a vertically movable platform is arranged above the impact plate. This platform is periodically raised and then suddenly released for dropping violently by gravity upon the impact plate, driving the chisels into the cement. Wheels are provided on the machine so that the latter may be advanced when the impact plate is raised to clear the cement.

Other objects and advantages of the invention will be apparent as the specification continues, and the novel features will be pointed out in the appended claims.

BRIEF DESCRIPTION OF THE DRAWINGS

For a better understanding of the invention, reference should be made to the accompanying drawings, forming part of this specification, in which.

While I have shown only the preferred embodiment of my invention, it should be understood that various changes, or modifications, may be made within the scope of the appended claims without departing from the spirit thereof.

DETAILED DESCRIPTION OF THE PREFERRED EMBODIMENT

Figure 1:
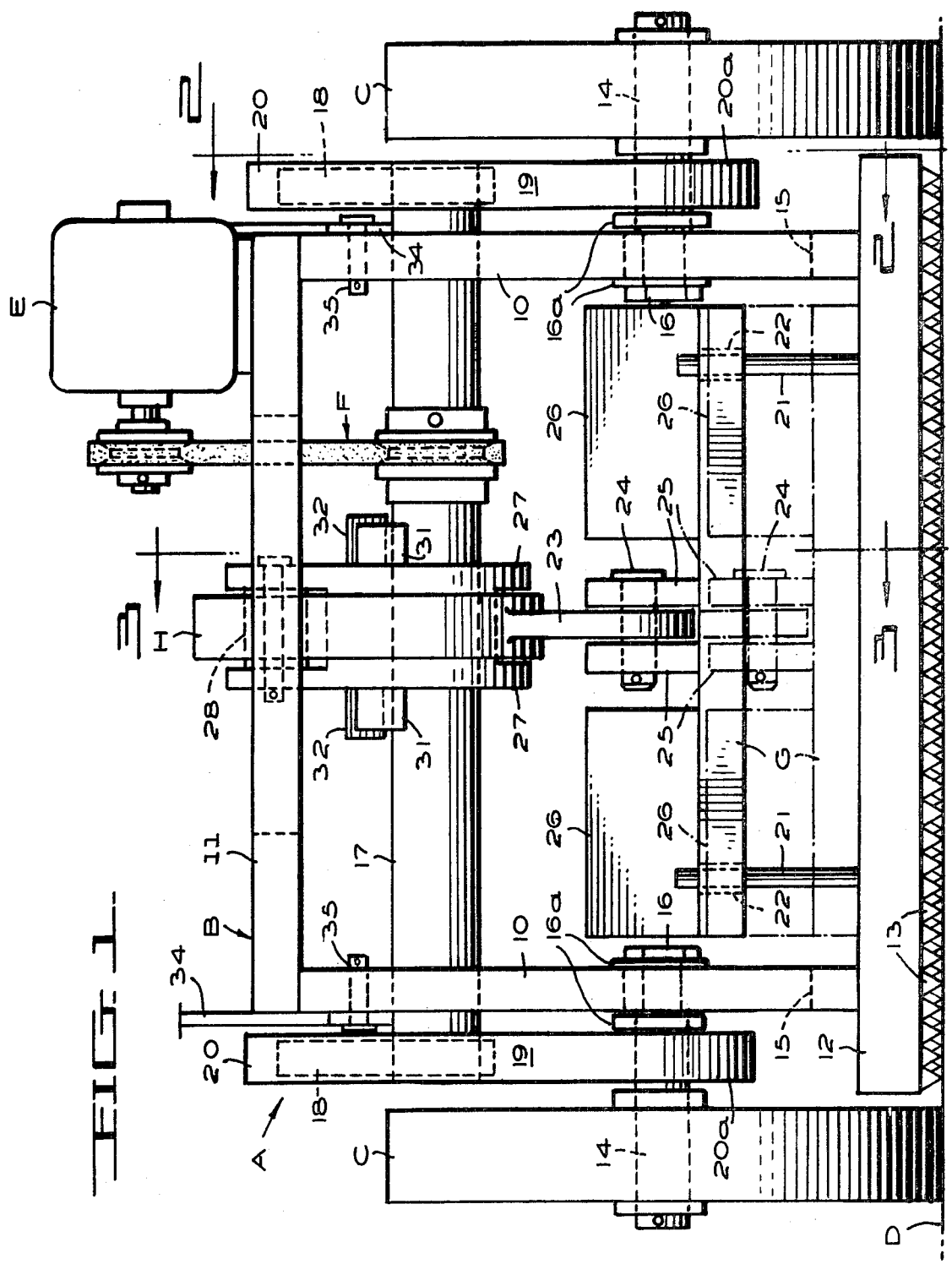
FIG. 1 is a front elevational view of my cement resurfacing machine.

Referring now to the drawings in detail, the cement resurfacing machine is designated generally at A in FIG. 1, and it has a carriage frame B supported by wheels C that ride along the cement floor D, or the like. This carriage frame is periodically raised, when the machine is to be advanced to a new position, and then is lowered, in the manner hereinafter described. The carriage frames defines spaced side plates 10, a top horizontal bar (1; and a lower horizontal impact 12; the latter having a grid of pointed chisels 13 on its underneath surface.

Stub shafts 14 on which the wheels C are mounted pass through elongated slots 15 formed vertically in the side plates 10, and the inner ends of these shafts are provided with nuts 16 thereon, and washers 16a surround the stub shafts and assist in guiding the latter up and down in the slots 15 (see FIG. 1).

It will be noted that a horizontal drive shaft 17 is rotatably mounted in the side plates 10 so as to extend transversely across the machine, and eccentrics 18 are secured to opposite ends of this shaft so as to be turned by the latter, such as by motor E mounted on the bar 11 and a belt-pulley drive F (see FIG. 1). Pitmans 19 have rings 20 that surround these eccentrics, and the lower ends of these pitmans are provided with bearings 20a in which the stub shafts 14 are supported, see FIG. 2.

Figure 2:
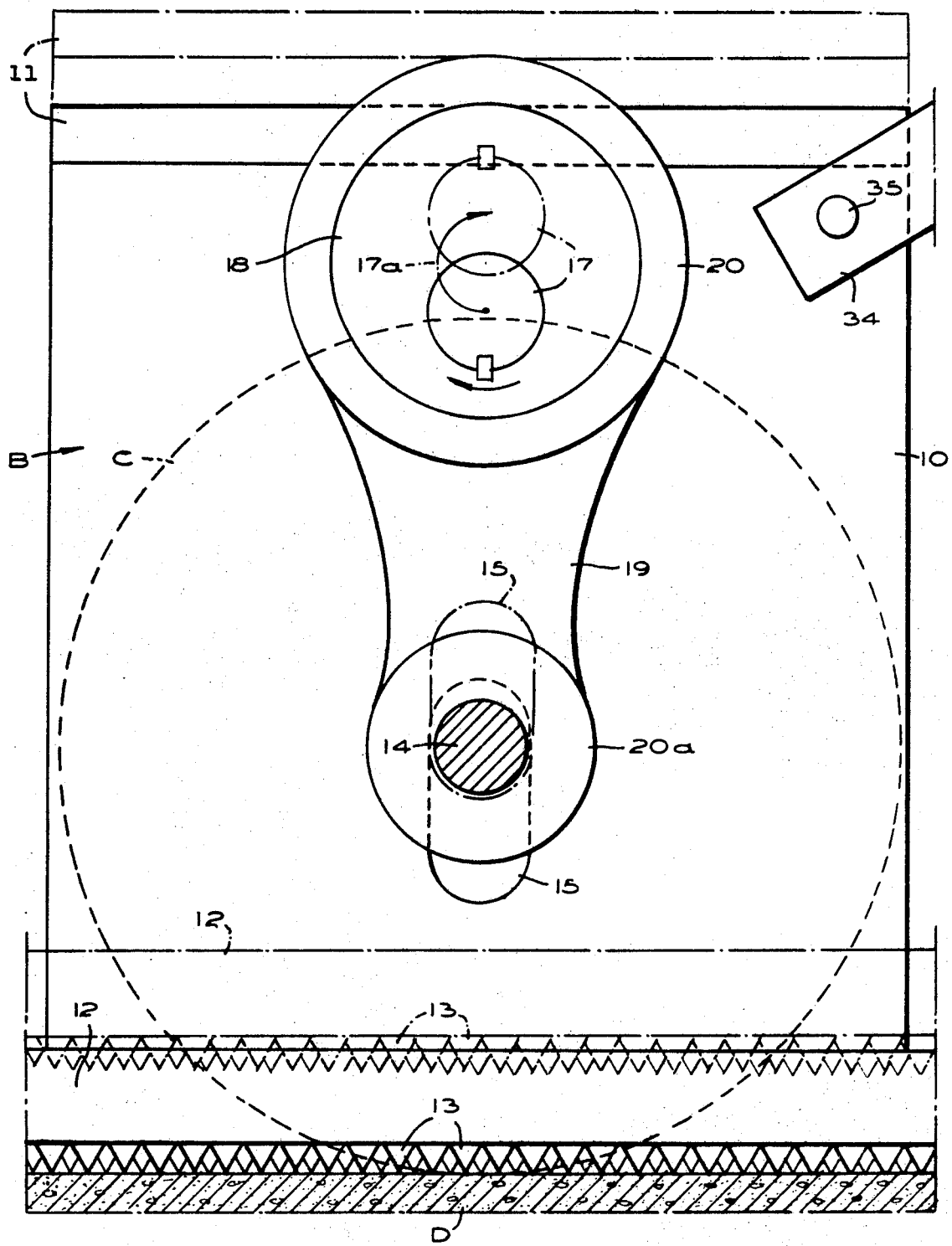
FIG. 2 is a sectional view taken along the vertical plane 2—2 of FIG. 1, and illustrating the carriage frame and the impact plate in raised position by dot-dash lines.

With the wheels C resting on the concrete floor D, rotation of the eccentrics 18 will carry the main drive shaft 17 from its full-line position shown in FIG. 2 into the dot-dash line position, as suggested by the arrow 17a. The elongated slots 15 in the side plates 10 permit this vertical movement, while the stub shafts 14 remain in position. As the shaft 17 moves upwardly, this shaft will raise the carriage frame B therewith, as shown by dot-dash lines in FIG. 2, and will raise the impact plate 12, as suggested by dot-dash lines in this view. This will permit the machine to be moved to a new position on the cement D. As the eccentrics 18 continue to be turned by the main drive shaft 17, the carriage frame B will be lowered again, with the elongated slots 15 sliding downwardly over the stub shafts 14 until the impact plate 12 again rests upon the cement D, as shown in full lines in FIGS. 1, 2 and 3 of the drawings.

It will be noted that a vertically movable platform G is disposed horizontally between the side plates 10 of the carriage frame B, above the impact plate 12, and the latter has vertical rods 21 secured thereto, these rods passing upwardly through holes 22 formed in the platform G to thus guide the latter for up and down movement.

Figure 3:
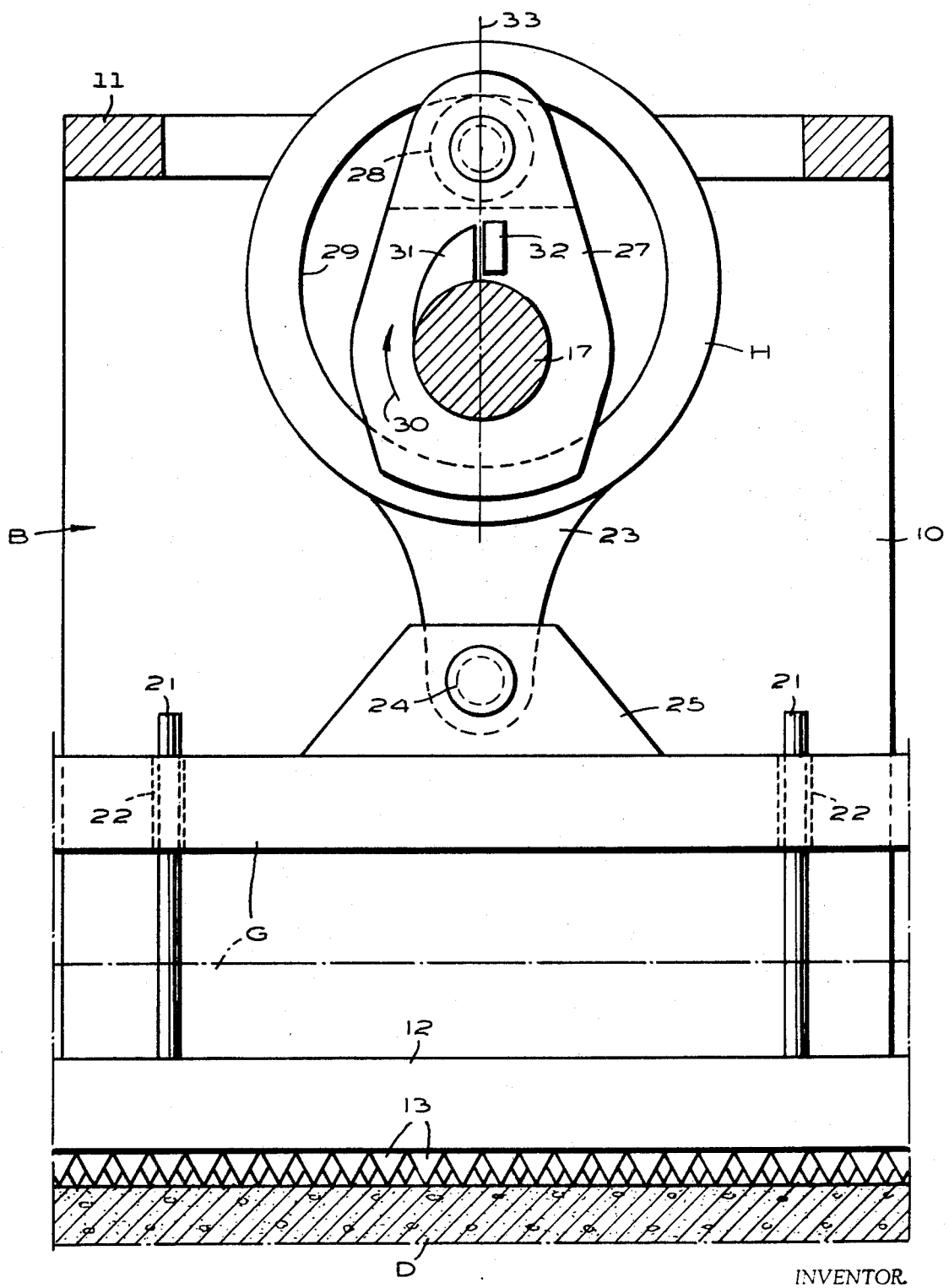
FIG. 3 is a central sectional view taken along the vertical plane 3—3 of FIG. 1, and disclosing the mechanism for raising the vertically movable platform with respect to the impact plate.

Moreover, as disclosed in FIGS. 1 and 3, a central ring H loosely encircles the drive shaft 17 and has a depending link 23 connected to this ring, the lower end of this link being coupled by a journal pin 24 to lugs 25 formed integral with the top of the platform G. The latter is provided with weights 26 thereon.

A pair of crankarms 27 are rotatably provided on the drive shaft so that these crankarms may turn relative to this shaft, and they support a roller 28 that rides on the inner surface 29 of the ring H. As the shaft 17 is turned in a clockwise direction in FIG. 3, indicated by arrow 30, the roller 28 will raise the ring H and thus elevate the platform G. Cams 31 on the shaft 17 engage with lugs 32 that are fixed to the crankarms 27, causing the latter to move in a clockwise direction in FIG. 3. However, when the roller 28 passes over the top of the vertical plane 33 that extends through the center of the shaft 17, the lugs 32 will disengage from contact with the cams 31, permitting the weighted platform G to descend rapidly and violently with force, striking the impact plate 12, as indicated by dot-dash lines in FIGS. 1 and 3, and driving the pointed chisels 13 into the cement D and forming a roughened or scarified surface on the latter.

Any suitable means may be provided for moving the machine over the cement D, and for this purpose, handles 34 have been pivotally attached by journal pins 35 to the side plates 10 of the carriage frame B.

I claim:

1. In a cement resurfacing machine:
   a. a carriage frame supported by wheels that ride along cement, the carriage frame being arranged for periodically raising and lowering movements with respect to the cement;
   b. the carriage frame being provided with a lower horizontal impact plate having a grid of pointed chisels on its underneath
   c. a vertically movable platform arranged above the impact plate and being movable into contact with the latter;
   d. platform-elevating means operable to raise the platform periodically and then suddenly release the platform for dropping violently by gravity upon the impact plate, driving the chisels into the cement to roughen or scarify the latter;
   e. and carriage-elevating means operable to raise the carriage frame and carry the impact plate therewith so that the latter will clear the cement, whereby the machine may be moved to a new position on the cement;
   f. the carriage-elevating means comprising:
      1. a horizontal drive shaft rotatably mounted in the carriage frame so as to extend transversely relative to the machine;
      2. eccentrics secured to opposite ends of the drive shaft so as to be turned by the latter;
      3. pitmans having rings that surround the eccentrics, and the lower ends of these pitmans being provided with bearings in which stub shafts of the wheels are supported, the stub shafts holding the pitmans from being raised;
      4. the eccentrics, when turned, resulting in elevating the carriage frame therewith and further raising the impact plate away from the cement.

2. The cement resurfacing machine, as set forth in claim 1;
g. and in which the carriage frame defines spaced side plates having elongated vertical slots formed therein, and the stub shafts extending through these slots, whereby the carriage frame may be raised and lowered while the wheels continue to rest on the cement.

3. In a cement resurfacing machine:
a. a carriage frame supported by wheels that ride along cement, the carriage frame being arranged for periodically raising and lowering movements with respect to the cement;
b. the carriage frame being provided with a lower horizontal impact plate having a grid of pointed chisels on its underneath surface;
c. a vertically movable platform arranged above the impact plate and being movable into contact with the latter;
d. platform-elevating means operable to raise the platform periodically and then suddenly release the platform for dropping violently by gravity upon the impact plate, driving the chisels into the cement to roughen or scarify the latter;
e. and carriage-elevating means operable to raise the carriage frame and carry the impact plate therewith so that the latter will clear the cement, whereby the machine may be moved to a new position on the cement;
f. the platform-elevating means comprising:
1. a horizontal drive shaft rotatably mounted in the carriage frame so as to extend transversely relative to the machine;
2. a pair of crankarms rotatably provided on the drive shaft so that the crankarms may turn relative to this shaft;
3. a ring loosely encircling the drive shaft and having a depending link connected to the ring, the lower end of this link being coupled by a journal pin to lugs formed on the platform;
4. the crankarms supporting a roller that rides on the inner surface of the ring, the roller raising the ring and thus elevating the platform as the crankarms are turned;
5. cams secured to the drive shaft and disposed to engage with lugs on the crankarms to turn the latter as the drive shaft is rotated, the lugs being arranged to disengage from contact with the cams when the roller passes over the top of a vertical plane that extends through the center of the drive shaft, permitting the platform to drop rapidly against the impact plate.

* * * * *